United States Patent [19]

Shimoda et al.

[11] Patent Number: 4,855,908
[45] Date of Patent: Aug. 8, 1989

[54] POS SYSTEM

[75] Inventors: Makoto Shimoda; Tatsuyuki Ishino; Makoto Matsuo, all of Kawasaki, Japan

[73] Assignee: Fujitsu Limited, Kawasaki, Japan

[21] Appl. No.: 814,039

[22] Filed: Dec. 27, 1985

[30] Foreign Application Priority Data

Dec. 27, 1984 [JP] Japan .................... 59-280631
Dec. 28, 1984 [JP] Japan .................... 59-275303
Dec. 28, 1984 [JP] Japan .................... 59-275304

[51] Int. Cl.⁴ .................................. G06F 13/06
[52] U.S. Cl. .................... 364/405; 364/900
[58] Field of Search ........... 364/405, 900 MS File, 364/400

[56] References Cited

U.S. PATENT DOCUMENTS

| | | | |
|---|---|---|---|
| 4,266,271 | 5/1981 | Chamoff | 364/401 X |
| 4,293,911 | 10/1981 | Oonishi | 364/900 X |
| 4,502,120 | 2/1985 | Oonishi | 364/405 |

OTHER PUBLICATIONS

IBM Technical Disclosure Bulletin, vol. 26, No. 3A, Aug. 1983, p. 1202, N.Y.; N. C. Strole: "Store System with Distributed Price Look-Up Function".
IBM Technical Disclosure Bulletin, vol. 24, No. 2, Jul. 1981, pp. 976–978, N.Y.; M. E. Chamoff et al.: "Dynamic Self-Optimizing Price Lookup for Retail Terminal System".
Patents Abstracts of Japan, vol. 8, No. 86, (P-269)[1523], Apr. 19, 1984; and JP-A-59 2175, (Fujitsu K.K.), 07-01-84.

Primary Examiner—Jerry Smith
Assistant Examiner—Charles B. Meyer
Attorney, Agent, or Firm—Staas & Halsey

[57] ABSTRACT

In a POS system including at least one controller and a plurality of POS terminals, the controller includes a price look-up file formed by a price look-up table and a sum table. When the price look-up table is searched by a price look-up inquiry signal, the sum table is correspondingly accessed by an address information from the price look-up table and the sum table.

12 Claims, 10 Drawing Sheets

Fig. 5

| | |
|---|---|
| 11 | ORIGINAL UNIT PRICE |
| 10 | BANK, ADDRESS CODE |
| 9 | ATTRIBUTE |
| 8 | ARTICLE NAME |
| 7 | UNIT PRICE |
| 6 | CLASSIFICATION CODE |
| 5 | ARTICLE CODE |
| 4 | DESIGNATION |
| 3 | SIGNAL IDENTIFICATION CODE |
| 2 | ITEM IDENTIFICATION |
| 1 | ITEM LENGTH |

Fig. 6

| | |
|---|---|
| 4 | ARTICLE CODE |
| 3 | PLU INQUIRY |
| 2 | ITEM IDENTIFICATION |
| 1 | ITEM LENGTH |

POS SYSTEM

REFERENCE TO RELATED APPLICATION

This application is related to co-pending U.S. application Ser. No. 06/813,951, filed on Dec. 27, 1985 and assigned to the same assignee as the subject application.

BACKGROUND OF THE INVENTION

1. Field of the Invention

The present invention is related to a Point-Of-Sales (POS) system employed in, for example, department stores, supermarkets and the like. This system is mainly constituted by a computer system.

2. Description of the Related Art

Recently, in department stores and supermarkets which handle a variety of goods on a very large scale, the sales and stock data of such goods are managed by a POS system constituted, in general, by a central control computer (controller) provided in a management center in the store and a plurality of POS terminals provided at each sales counter in the store. Each POS terminal comprises at least a keyboard, a bar-code reader (scanner), and a display device. The POS terminal also comprises at least one memory device used as a Price Look-Up (PLU) table for storing article codes, article names, unit prices, and the like. Conventionally, the PLU table is provided in the POS terminal because this table must be frequently indexed by an operator at the POS terminal.

Article data such as the unit cost of the article stored in the PLU table of each POS terminal is often changed on a daily basis, or even during the course of business. Therefore, each day it may be necessary to transmit the article data in the PLU table to each POS terminal, from the central computer, prior to the start of business, to update the contents of the PLU table in each POS terminal. However, the transmission of the article data to each POS terminal takes a long time and involves a complicated procedure. In particular, when it becomes necessary to update the PLU table, for example, to change unit costs, correct erroneous article data, or register new article data into the PLU table, etc., during the course of business, the central computer must correct the data in the PLU table and transmit the corrected data to all of the POS terminals. However, this operation wastes time, and during that time, service at the POS terminal is interrupted, with the result that customers must be kept waiting for an inordinate length of time. Obviously, it would be preferable if the updating of the PLU table could be performed immediately from an individual POS terminal, and the result of the updating be immediately and simultaneously reflected at all other POS terminals in the POS system. Further, to require each POS terminal to contain the PLU table greatly incrases the cost of the POS system.

SUMMARY OF THE INVENTION

The primary object of the present invention is to provide a POS system enabling a simultaneous search for a sum table when a PLU table is searched, thereby facilitating the obtaining of address information in the sum table.

Another object of the present invention is to provide a POS system enabling a reduction of the number times of a search is made when using an article code.

Still another object of the present invention is to provide a POS system enabling an inspection request to be made from any POS terminal to a controller.

In accordance with the present invention, there is provided a POS system, including at least one controller provided at a management center in a store, and a plurality of POS terminals provided at each sales counter in the store, the controller and each POS terminal being connected by a closed circuit in the store, the controller comprising: a price look-up (PLU) file which includes a PLU table and a sum table corresponding to the PLU table, the PLU table being searched by a PLU inquiry signal having an article code designated by the POS terminal, and the sum table being correspondingly accessed based on corresponding address information between the PLU table and the sum table when the PLU table is searched by the PLU inquiry signal.

BRIEF DESCRIPTION OF THE DRAWINGS

In the drawings:

FIG. 5 is a chart of communication format between the controller and the POS terminal according to the present invention, FIG. 6, is a chart of signal format of the PLU inquiry signal.

DESCRIPTION OF THE PREFERRED EMBODIMENTS

A POS system according to an embodiment of the present invention will be explained in detail below.

Figure 1:
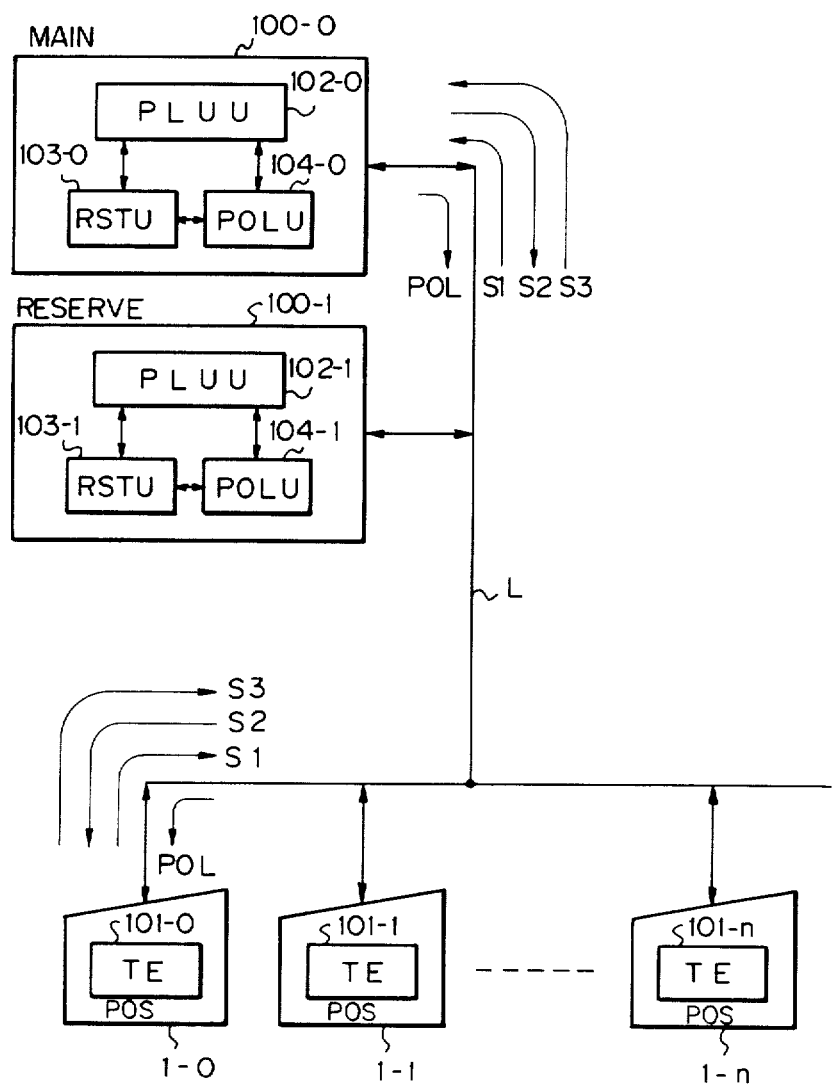
FIG. 1 is a schematic block diagram of a POS system according to an embodiment of the present invention.

Referring to FIG. 1, the POS system is formed at least two controllers, shown as a main controller 100-0 and a reserve or back-up controller 100-1, and a plurality of POS terminals 1-0 to 1-n The two controllers 100-0 and 100-1 and the POS terminals 1-0 to 1-n are connected by closed circuit L.

The controller 100-0 comprises a price look-up unit (PLUU) 102-0, a restoration unit (RSTU) 103-0 and a polling unit (POLU) 104-0: The reserve controller 100-1 has the same structure as the controller 100-0. The PLUU 102-0 comprises at least one main central processing unit (CPU), an arithmetic CPU, a sub-CPU, and a price look-up memory as explained in FIG. 2. The restoration unit 103-0 is used as a reserve or back-up PLU unit when the PLUU 102-0 is taken out of service. The polling unit 104-0 is used for generating a polling signal to the POS terminals 1-0 to 1-n and for checking whether the PLUU 102-0 is operating normally.

Figure 4A:
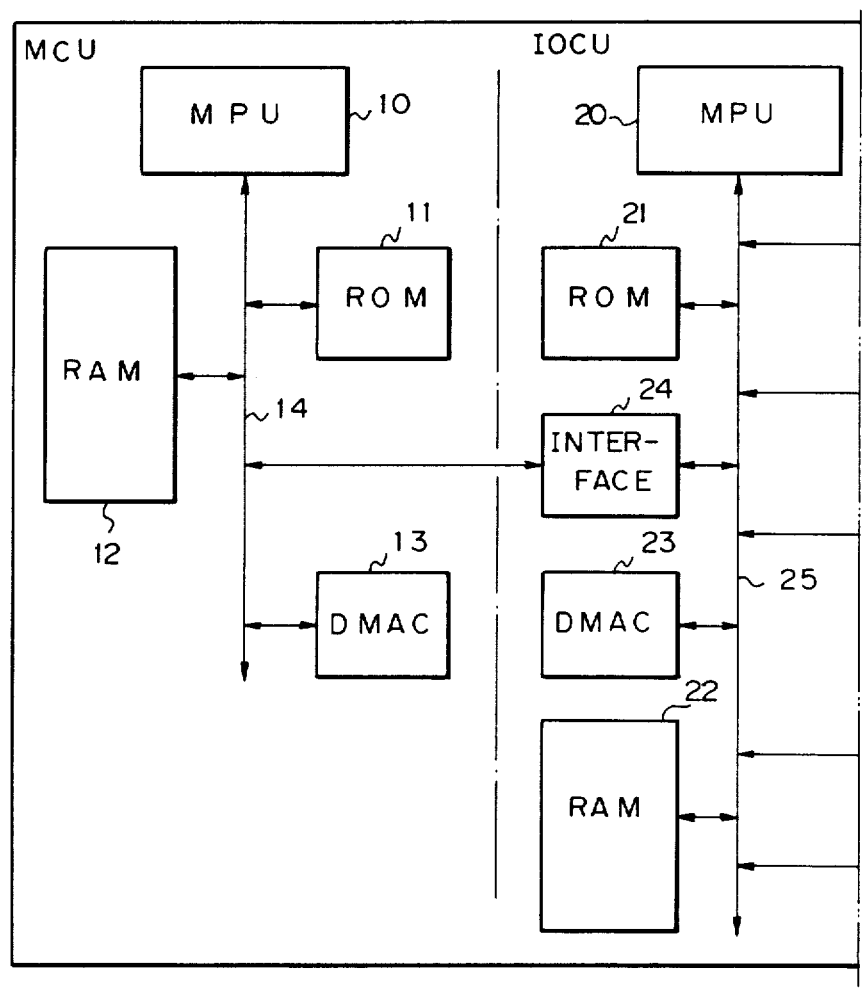
Figure 4:
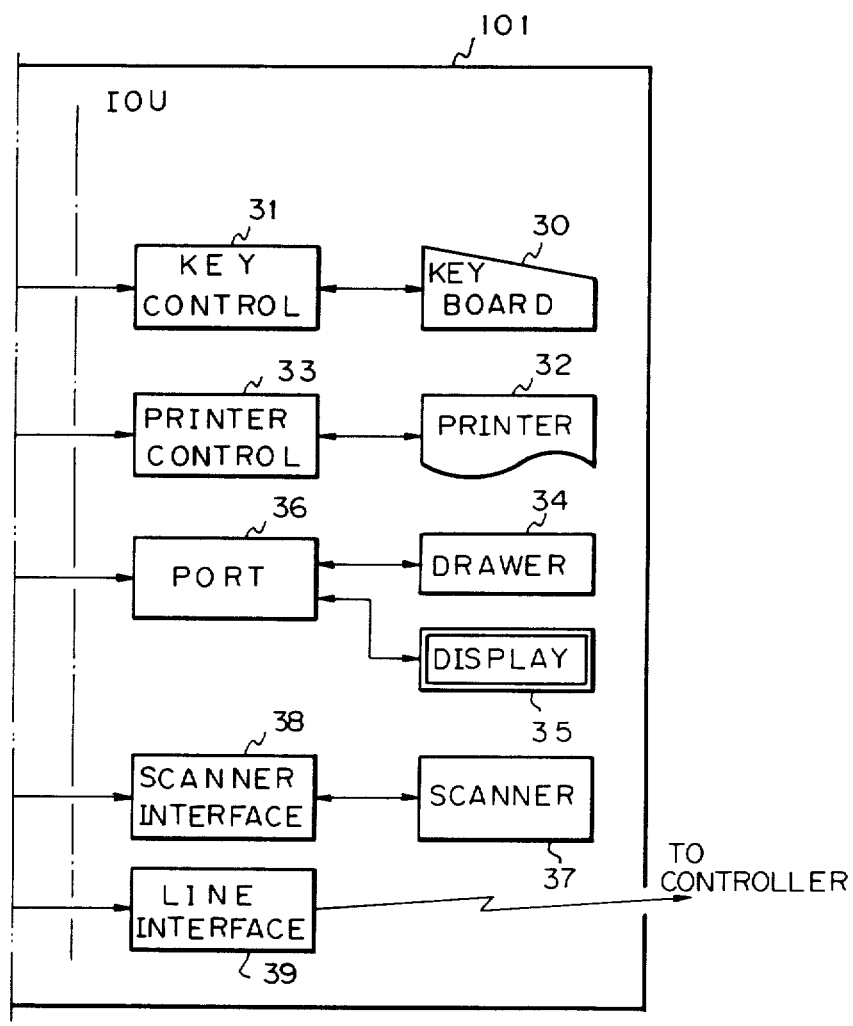

Each POS terminal 1-0 to 1-n comprises a terminal equipment (TE) unit 101-0 to 101-n as explained in FIG. 4.

The basic signal responses, for example, between the main controller 100-0 and the POS terminal 1-0 are as follows. The polling signal POL is always generated from the controller 100-0 to the POS terminals 1-0 to 1-n. In response to the polling signal POL, the PLU inquiry signal S1 is sent from the POS terminal 1-0 to the controller 100-0 to request unit price, etc. as the first step. In the next step, the PLU response signal S2 is sent from the controller 100-0 to the POS terminal 1-0 in response to the PLU inquiry signal S1. Finally, the article data S3 is sent from the POS terminal 1-0 to the controller 100-0 in response to the PLU response signal S2, to inform the controller 100-0 of the quantity of sales, sum of the money, and the like at the POS terminal 1-0.

Figure 2:
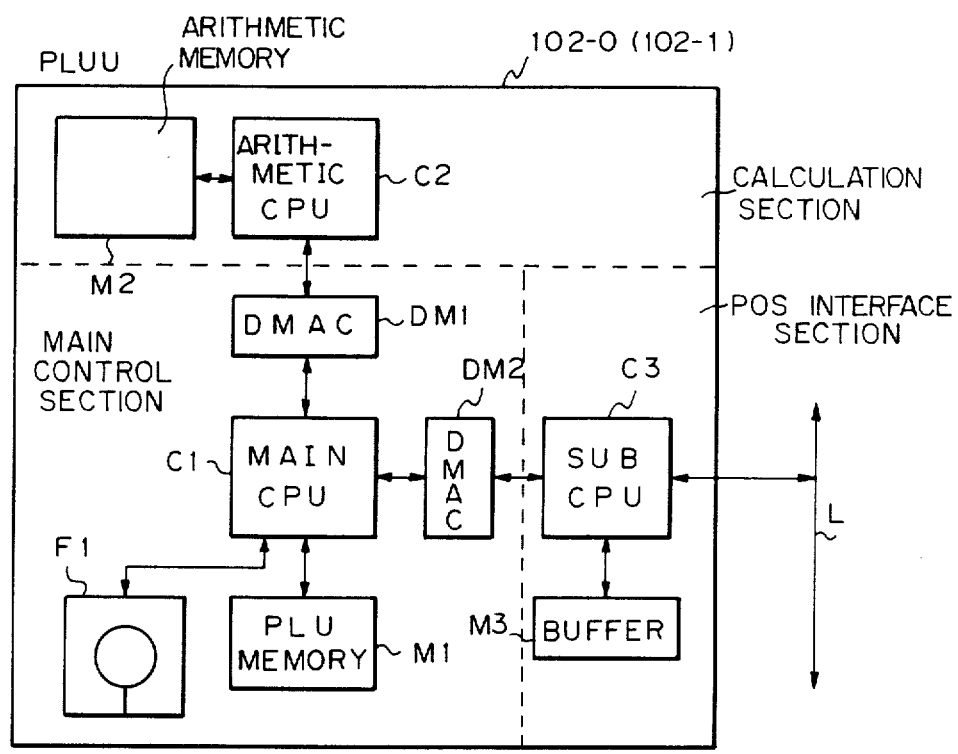
FIG. 2 is a detailed block diagram of the price look-up unit (PLUU) shown in FIG. 1.

Referring to FIG. 2, reference number C1 represents a main CPU, C2 an arithmetic CPU, and C3 a sub CPU. Reference number M1 represents a price look-up (PLU) memory, M2 an arithmetic memory, and M3 a buffer memory. DM1 and DM2 are direct memory access controllers (DMAC).

Figure 3:
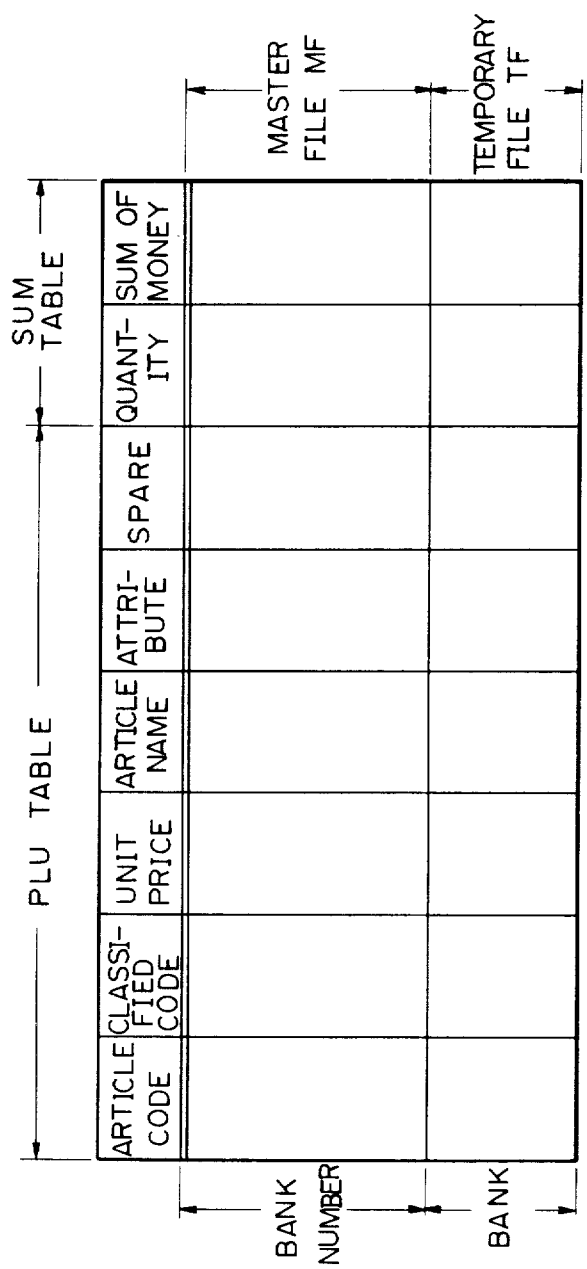
FIG. 3 is a detailed structure chart of a PLU file shown in FIG. 2, FIGS. 4A and 4B are detailed block diagrams of the POS terminal shown in FIG. 1.

The main CPU C1 basically executes task management for POS terminals 1-0 to 1-n through the sub CPU C3, which controls each of the POS terminals 1-0 to 1-n based on the PLU inquiry signals and response signals. The arithmetic CPU basically executes calculations for the main CPU and the sub CPU. The PLU memory M1 is used as a PLU file and includes a Master File portion and a Temporary File portion, as shown in FIG. 3. The arithmetic memory M2 is used for temporarily storing the results of the calculations of the arithmetic CPU C2. The memory M3 is used as a buffer when the closed circuit L is busy. Both direct memory access controllers DM1 and DM2 are used for quick access to data between these CPU's.

A floppy disk F1 is used for fixedly storing article data, for example, an article name, a unit price, or an attribute of an article.

As can be seen from FIG. 2, the sub CPU C3 and the buffer memory M3 constitute a POS interface section. The main CPU C1, PLU memory M1, floppy disk F1, DMAC DM1, and DMAC D2 constitute a main control section. The arithmetic CPU C2 and arithmetic memory M2 constitute a calculation section.

When a PLU inquiry signal is input to the sub CPU C3, the signal is sent to the main CPU C1 after being temporarily stored in the buffer memory M3. The main CPU C1 looks up the temporary memory and the master memory in the PLU memory M1, and the looked-up data along with the bank number and address are transmitted to the POS terminal through the buffer memory M3, and and the closed circuit L.

After a sale is made, the article data at the POS terminals 1-0 to 1-n is sent to the main CPU C1 through the sub CPU C3 and the buffer memory M3, and stored in the PLU memory M1.

The data stored in the PLU memory M1 is temporarily read out and added to the data read out from the arithmetic memory M2. This addition is performed by the arithmetic CPU C2. By this calculation, the quantity and sum of money are updated, and the data is refiled in the PLU file in the memory M1.

Referring to FIG. 3, the PLU file comprises a master file portion MF and a temporary file portion TF each of which has a PLU table and a sum table. The PLU table is used for storing article data, for example, the unit price of an article. The PLU table is divided into categories and can store the following data: an article code, a classification code, a unit price, an article name, and an attribute of an article. The PLU table also has a spare storage location. The sum table is used for summing prices and is divided into two categories: quantity and sum of money. The master file MF is used for fixedly storing article data for a long term and the temporary file TF is used for temporarily storing article data for a short term, e.g., about one day. The master file MF includes a plurality of banks, and each bank can store, for example, 450 article codes. The temporary file TF has only one bank.

Referring to FIGS. 4A and 4B, the POS terminal equipment comprises a main contro unit MCU, an input/output control unit IOCU and an input/output unit IOU.

Referring to FIG. 4A, the main control unit MCU is provided to analyze the contents of the master file, i.e., the article data, and for processing that data as sum and registration data. Reference number 10 represents a microprocessor unit MPU for processing these tasks by executing a control program; 11 represents a read only memory ROM for storing a control program and parameters necessary for carrying out the processing in the MPU 10; 12 represents a random access memory RAM for temporarily storing control data necessary for carrying out the operation in the MPU 10; 13 represents a direct memory access controller DMAC for directly accessing the ROM 11 and the RAM 12 in response to a command from the MPU 10; and 14 represents a data bus for intercorrection between these units.

The input/output control unit IOCU is provided to execute various tasks, for example, a key input task, scan task, print task, circuit control task and the like. Reference number 20 represents the IOCU microprocessor unit MPU, which processes the above tasks by executing a predetermined program; 21 represents the IOCU ROM for storing the IOCU control program and parameters necessary for carrying out the processing in the MPU 20; 22 represents the IOCU RAM for storing the data necessary for carrying out the operation in the MPU 20; 23 represents the IOCU DMAC for directly accessing the RAM 22 in response to a command from the MPU 20; and 24 represents an interface circuit for connection between the bus 14 in the MCU and the bus 25 in the IOCU and for transferring data and commands.

Referring to FIG. 4B, input/output unit IOU includes a keyboard 30, a printer 32, a cash drawer 34, a display 35, and a bar-code scanner 37. The IOU further comprises a key control means 31, a printer control means 33, a port 36, a scanner interface 38, and a line interface 39. The line interface 39 is connected to the controller 100-0 of the management center in the store.

When the article code and quantity are input from the keyboard 30 or the scanner 37 by an operator, the signal is sent to the MCU through the IOCU. After the necessary processing is performed between the MCU and the IOCU by using the DMAC 13 and 23, the signal is transmitted from the line interface 39 to the controller 100-0. These procedures will be explained in FIGS. 7 and 8.

Referring to FIG. 5, the communication signal format comprises eleven sections 1 to 11, that is, an item length 1 indicating the byte number of a signal, an item identification 2, a signal identification code 3, a designation 4, an article code 5, a classification code 6 indicating the kind of article, a unit price 7 an article name 8, an attribute 9, a bank number and address code 10, and an original unit price 11.

The signal identification code 3 comprises a maintenance request (from terminal to controller), an old data signal (from controller to terminal), a new data signal (from terminal to controller), a non-registration signal (from controller to terminal), a double-registration signal (from controller to terminal), a busy signal (from controller to terminal), a process completion signal (from controller to terminal), and a process noncompletion signal (from controller to terminal).

The designation 4 is used when the terminal designates a creation, change, erasure, and combination of the data. Accordingly, this code is sent from the terminal to the controller.

The attribute 9 carries information regarding a so-called bundled and mixed sale. The bank number and address code 10 carries position data (address data) in the sum table corresponding to the article code. The original unit price 11 carries price information at the bundled and mixed sale.

Referring to FIG. 6, the PLU inquiry signal comprises four sections 1 to 4, that is, an item length 1, item identification 2, PLU inquiry 3, and article code 4.

Figure 7A:
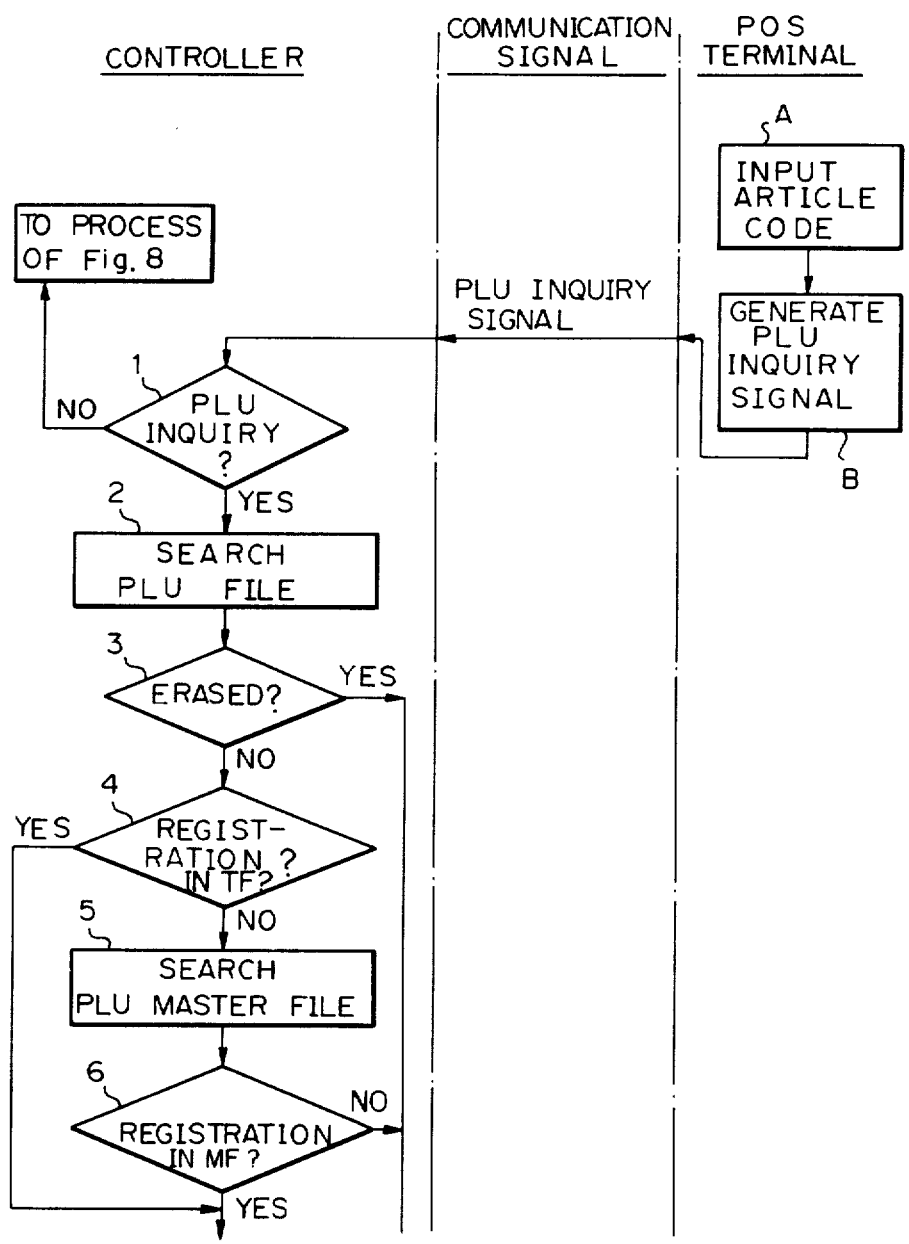
FIGS. 7A and 7B are schematic process flowcharts showing the signal processing between the controller and the POS terminal according to an embodiment of the present invention.
Figure 7B:
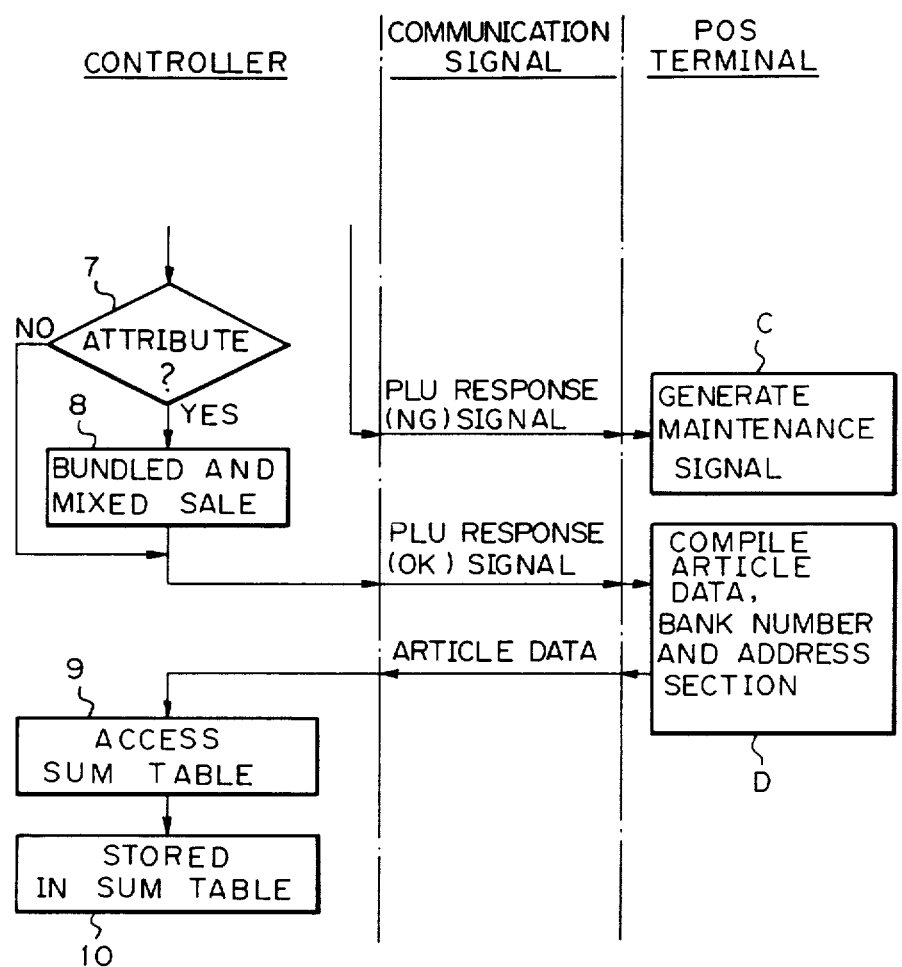

Referring to FIGS. 7A and 7B, the flowchart indicates the signal processing between the controller and the terminal.

In the POS terminal, the article code is input from the keyboard or the bar-code scanner (step A). The PLU inquiry signal is generated based on the article code and sent to the controller (step B).

In the controller, it is judged whether this signal is a PLU inquiry signal or an inspection request signal (step 1). If this signal is the inspection request signal, the process goes to the flowchart shown in FIG. 8. If this signal is the PLU inquiry signal, the temporary file TF of the PLU file is searched (step 2). As shown in FIG. 3, since the PLU file is constituted by the PLU table and the sum table, the bank number and the address at the sum table can be simultaneously extracted when the PLU table is searched based on this inquiry signal. If the article code has been accidentally erased in the PLU table, the controller transmits the PLU response (NG) signal to the POS terminal (step 3). If the article code has not been erased but is not registered in the temporary file TF (step 4), the master file MF of the PLU file is searched (step 5). However, if the article code is registered in the temporary file TF, the attribute is checked (step 7). If the article code is not registered in the master file MF the controller also transmits the PLU response (NG) signal to the POS terminal as a non-registration response (step 6). If the article code is registered in the master file MF the attribute is checked (step 7).

When the attribute, i.e., conditins of sale, exists, the process of bundled and mixed sale is performed in the controller. Moreover, the PLU response (OK) signal including the bank number and the address is sent to the POS terminal (step 8). When the attribute does not exist, the PLU response (OK) signal is also sent to the POS terminal. In this case, the bank number and the address are also sent to the POS terminal.

When the PLU response (NG) signal is input to the POS terminal, the POS terminal generates a maintenance signal and transmits that signal to the controller (step C). When the PLU response (OK) signal is input to the POS terminal, the POS terminal groups the article data for quantity and sum of money with the bank number and the address section, and transmits that data to the controller (step D).

In the controller, the sum table is accessed by the bank number and the address, which are received from the POS terminal (step 9), and the resultant data is stored in the sum table (step 10).

Figure 8:
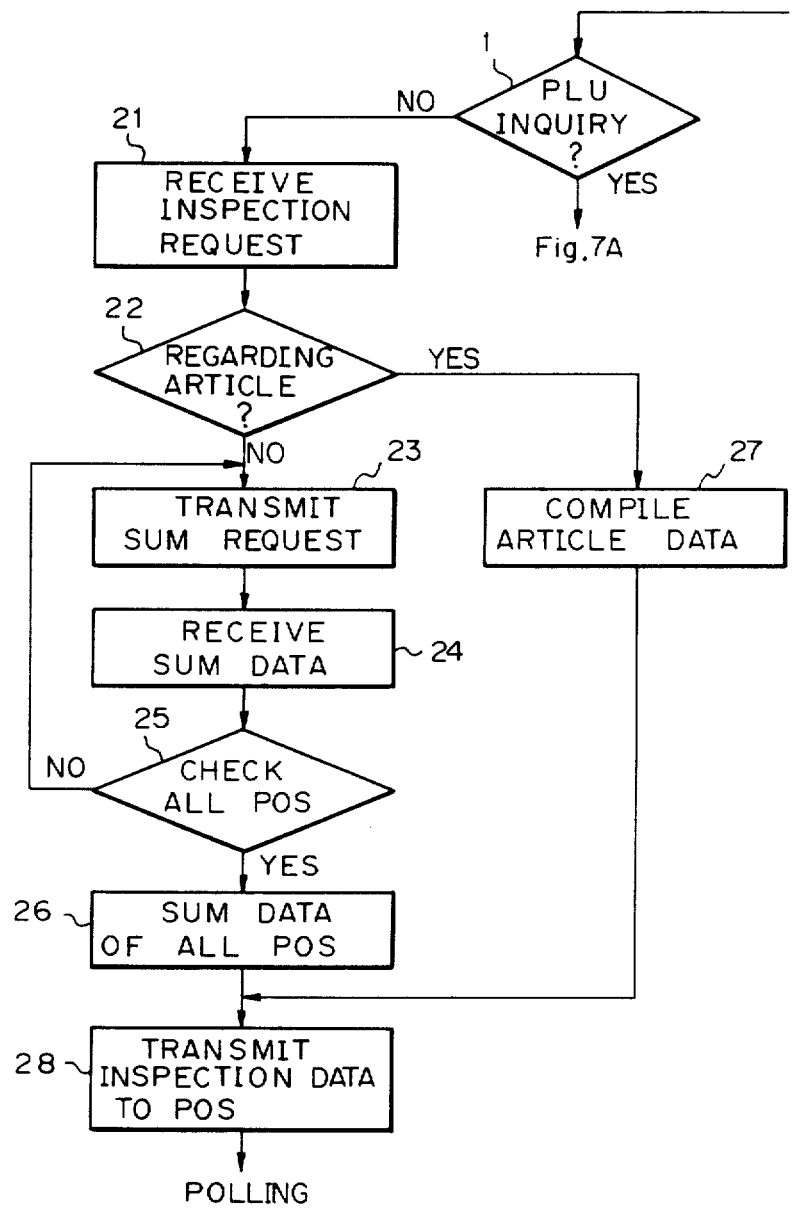
FIG. 8 is a schematic process flowchart showing signal processing performed by in the controller.

Referring to FIG. 8, when the signal is the inspection request signal (step 1), this signal is input to the controller (step 21). Next, in the controller, this signal is checked to determine whether or not it is in regard to an article or not (step 22). If this signal is not in regard to an article, the controller transmits a request signal to each POS terminal (step 23) to compile the data. The controller receives data from all POS terminals (step 24). The controller also checks whether or not the data is input from all POS terminals (step 25). When the data is input from all the POS terminals, the data is summed as the data from all POS terminals (step 26). Finally, the inspection data is sent to the POS terminal which-generated the inspection request signal (step 28). If this signal is in regard to an article as shown by step 22, the controller compiles the article data (step 27). This data is sent to the POS terminal (step 28).

Figure 9:
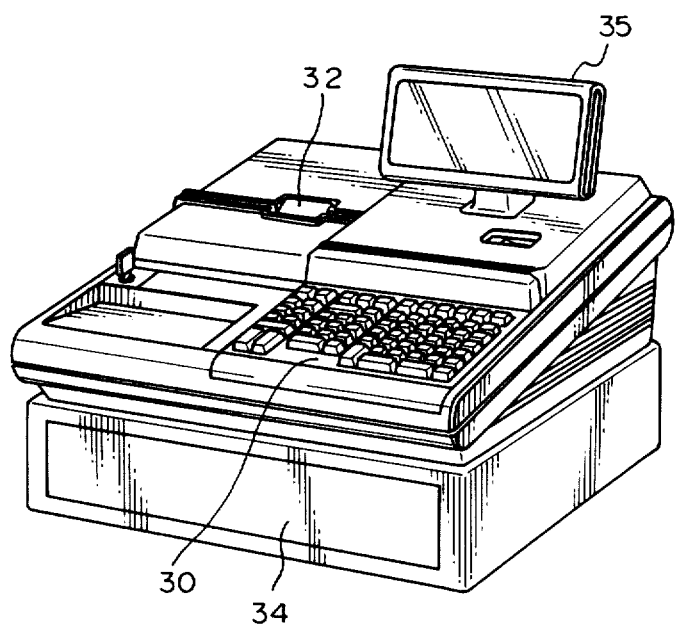
FIG. 9 is a perspective view of the POS terminal shown in FIG. 1.

Referring to FIG. 9, this POS terminal is provided at each sales counter in the store as explained above. The operator operates the keyboard 30 based on the article code, article name, and unit price. After summing, the drawer 34 is opened and summing data is displayed on the display panel 35 and printed out by the printer 32.

What is claimed is:

1. A point-of-sales system including at least one controller provided at a management center in a store and a plurality of point-of-sales terminals, each sales counter in said store provided with one of said point-of-sales terminals, said controller and each of said point-of-sales terminals being connected by a closed circuit in said store, said controller comprising:
a price look-up file including a price look-up table and a sum table for storing article data, and a master file for storing fixed article data for a first time interval and a temporary file for temporarily storing article data for a second time interval shorter than the first time interval, all of the article data having an article code assigned thereto; and
each of said point of sales terminals including means for generating a price look-up inquiry signal having a particular article code designated by any of said point-of sales terminals, said price look-up table and said sum table being searched simultaneously by said price look-up inquiry signal for all data having the particular article code assigned thereto.

2. A point-of-sales system as claimed in claim 1, wherein said price look-up table comprises means for storing at least an article code, an article name, a unit price and an attribute of an article.

3. A point-of-sales system as claimed in claim 1, wherein said sum table comprises means for storing a number representing a quantity of an article and a number representing a sum of money.

4. A point-of-sales system as claimed in claim 1, wherein said price look-up inquiry signal comprises at least an item length, an item identification, a signal identification code, an article code, a unit price, an article name, and an attribute of an article.

5. A point-of-sales system as claimed in claim 1, wherein:
said controller further comprises:
  means for compiling data received from each of said point-of-sales terminals; and
  means for transmitting data compiled by said compiling means;
said point-of-sales terminal further includes means for generating an inspection request signal; and
when said controller receives an inspection request signal from one of said point-of-sales terminals, said transmitting means at said controller transmits the compiled data to said one of said point-of-sales terminals.

6. A sales system comprising:
a controller including:
  memory file including:
    a price look-up table and a sum table, each capable of storing data having an address designation assigned thereto;
    a master file for storing article data; and
    a temporary file for temporarily storing article data;
  means for receiving data; and
  processing means for searching the contents of the price look-up table and the sum table; and
a plurality of terminals, each terminal including means for transmitting a price inquiry signal including an address designation to said controller, said processing means simultaneously searching the contents of the price look-up table and the contents of the sum table for data assigned with the address designation of the price inquiry signal when said controller receives the price inquiry signal.

7. A sales system as claimed in claim 6, wherein the data stored in the price look-up table includes at least an article code, an article name, a unit price, and an article attribute.

8. A sales system as claimed in claim 6, wherein the data stored in the sum table further includes a quantity value and a sum of money value.

9. A sales system as claimed in claim 6, wherein the price look-up inquiry signal further includes at least an item length, an item identification, a signal identification code, an article code, a unit price, an article name, and an article attribute.

10. A sales system as claimed in claim 6 wherein:
said controller further includes:
  compiling means for compiling data received from each of said terminals; and
  means for transmitting the compiled data to said terminals;
each of said terminals further includes:
  means for receiving the transmitted compiled data from said controller; and
  means for transmitting an inspection request signal; and
when said controller receives an inspection request signal from one of said terminals, said transmitting means of said controller transmits the compiled data to said one of said terminals.

11. A point-of-sales system including at least one controller provided at a management center in a store and a plurality of point-of-sales terminals, each sales counter in said store provided with one of said point-of-sales terminals, said controller and each of said point-of-sales terminals being connected by a closed circuit in said store,
said controller comprising:
  a price look-up file including a price look-up table and a sum table for storing article data, all of the article data having an article code assigned thereto; and
  each of said point of sales terminals including means for generating a price look-up inquiry signal having at least an item length, an item identification, a signal identification code, an article code, a unit price, an article name, an attribute and a particular article code designated by any of said point-of-sales terminals, said price look-up table and said sum table being simultaneously searched by said price look-up inquiry signal for all data having the particular article code assigned thereto.

12. A point-of-sales system including at least one controller provided at a management center in a store and a plurality of point-of-sales terminals, each sales counter in said store provided with one of said point-of-sales terminals, said controller and each of said point-of-sales terminals being connected by a closed circuit in said store,
said controller comprising:
  a price look-up file including a price look-up table and a sum table for storing article data;
  first means for compiling data corresponding to an inspection request signal from all point-of-sales terminals; and
  second means for transmitting said compiled data to a point-of-sales terminal generating an inspection request signal, all of the article data having an article code assigned thereto; and
each of said point of sales terminals including means for generating a price look-up inquiry signal having a particular article code designated by said point-of sales terminal generating the inspection request signal, said price look-up table and a sum table being searched simultaneously by said price look-up inquiry signal for all data having the particular article code assigned thereto.

* * * * *

UNITED STATES PATENT AND TRADEMARK OFFICE
CERTIFICATE OF CORRECTION

PATENT NO. : 4,855,908
DATED : AUGUST 8, 1989
INVENTOR(S) : MAKOTO SHIMODA ET AL.

It is certified that error appears in the above-identified patent and that said Letters Patent is hereby corrected as shown below:

Col. 1, line  4, before "REFERENCE" insert --CROSS--;
       line 58, "incrases" should be --increases--;
       line 68, delete "of".

Col. 2, line 48, after "formed" insert --by--.

Col. 3, line 42, "D2" should be --DM2--;
       line 52, "and and" should be --and sub CPU C3 and--.

Col. 4, line 13, "contro" should be --control--.

Col. 5, line 23, "1," should be --code 1,--;
       line 24, "2," should be --code 2,--; and
       line 24, "3," should be --code 3,--;
       line 55, "conditins" should be --conditions--.

Signed and Sealed this

Twenty-fourth Day of July, 1990

*Attest:*

HARRY F. MANBECK, JR.

*Attesting Officer*     *Commissioner of Patents and Trademarks*